United States Patent [19]

Webb et al.

[11] Patent Number: 5,483,340
[45] Date of Patent: Jan. 9, 1996

[54] SAGNAC LOOP INTERFEROMETER

[75] Inventors: Roderick P. Webb; Alan W. O'Neil, both of Suffolk, England

[73] Assignee: British Telecommunications plc, London, England

[21] Appl. No.: 39,081

[22] PCT Filed: Aug. 30, 1991

[86] PCT No.: PCT/GB91/01467

§ 371 Date: Mar. 30, 1993

§ 102(e) Date: Mar. 30, 1993

[87] PCT Pub. No.: WO92/04655

PCT Pub. Date: Mar. 19, 1992

[30] Foreign Application Priority Data

Aug. 31, 1990 [GB] United Kingdom ............... 9019010

[51] Int. Cl.$^6$ .................................................... G01B 9/02
[52] U.S. Cl. ............................................ 356/345; 356/351
[58] Field of Search ........................... 356/345, 351, 356/359, 350; 250/227.27, 227.11

[56] References Cited

PUBLICATIONS

*Optics Letters*, vol. 15, No. 13, 1 Jul. 1990, New York, N.Y., US, pp. 752–754; Ferman et al: "Nonlinear Amplifying Loop Mirror".
*Applied Physics Letters*, vol. 55, No. 1, 3 Jul. 1989, New York, N.Y., pp. 25–26; Farries et al: "Optical Fiber Switch Employing a Sagnac Interferometer".
*Optics Letters*, vol. 14, No. 14, 15 Jul. 1989, New York, pp. 754–765; Blow et al: "Experimental Demonstration of Optical Soliton Switching in All–Fiber Nonlinear Sagnac Interferometer".
*Electronics Letters*, vol. 26, No. 21, 11 Oct. 1990, Stevenage Herts., GB, pp. 1779–1781; Richardson et al: "Very Low Threshold Sagnac Switch Incorporating An Erbium Doped Fibre Amplifier".
*Electronics Letters*, vol. 26, No. 24. 22 Nov. 1990, Stevenage, Herts., GB, pp. 2008–2009, Webb et al: "All–Optical Loop Mirror Switch Employing An Asymmetric Amplifier/Attenuator Combination".
PCT International Search Report.

*Primary Examiner*—Robert P. Limanek
*Assistant Examiner*—David B. Hardy
*Attorney, Agent, or Firm*—Nixon & Vanderhye

[57] ABSTRACT

A Sagnac interferometer (19) is defined by four port, 50:50 optical fiber coupler (20), two output ports (38, 40) of which are coupled together by a non-linear semiconductor laser amplifier (3) in series between a pair of optical fibres (22, 24). The coupling losses between the ports (38, 40) and the amplifier (30) are different. An input pulse coupled to port (34) of the coupler (20) is split into two portions which counterpropagate from one of the output ports (38, 40) to the other. The portions return to the coupler (20) with an intensity dependent relative phase shift. This provides switching of an input pulse at the input port (34) between the input ports (34 and 36) dependant on the intensity of the input pulse. The device can provide intensity dependent switching at optical power levels of less than 250 μW.

19 Claims, 3 Drawing Sheets

SAGNAC LOOP INTERFEROMETER

FIELD OF INVENTION

This invention relates to interferometers and in particular to Sagnac loop interferometers in which a four port optical coupler having a first and a second input port and a first and a second output port has an optical coupling means coupling the first and second output ports.

An optical input signal coupled to an input port of such an interferometer is split into two portions by the optical coupler which portions counterpropagate round the coupling means, for example an optical fibre, to return to, and recombine at, the coupler. For an optically linear optical coupling means the optical path along the coupling means is the same for the two portions. For 50:50 splitting, the portions recombine such that the input signal emerges from the port to which it was originally input. The input signal is said to be "reflected" by the Sagnac interferometer. For this reason this configuration is often described as a loop mirror.

BACKGROUND OF THE INVENTION

The applicants co-pending application, publication number WO 88/02875, describes a Sagnac interferometer in which the symmetry of the two counterpropagating directions along the coupling means is broken so as to obtain a relative phase shift in the counterpropagating portions of the input signal. This can be achieved by, for example, providing a coupling ratio of other than 50:50 and an optically non-linear optical fibre waveguide constituting the coupling means. In this case the intensities of the signal portions coupled into the ends of the waveguide are not equal. If input signals are of sufficient intensity to produce self-phase modulation of the optical portions as they propagate around the optical fibre loop, the signal portions propagating in opposite directions around the waveguide will experience different refractive indices due to the Kerr effect. This results in the signals experiencing different phase shifts so that when the signals return back to the coupling means they have an intensity dependent relative phase shift.

The intensity dependence of the relative phase shift results in a device whose output at an input port is an oscillatory function of the intensity of the input signal. Any signal exiting the second input port (ie the port to which the input signal is not coupled) is said to be "transmitted" by the interferometer. This property can be used in a variety of applications including logic elements, optical amplifiers, optical switches and the like although complete switching is not obtained due to the non 50:50 splitting.

A disadvantage of this configuration is that the small Kerr effect coefficient of currently available optical fibre materials limits its use since a large optical power loop-length product is required to produce the necessary phase shifts.

A known approach to obviating this disadvantage is to incorporate an asymmetrically located optical amplifier in the loop with the Sagnac loop having a 50:50 coupler as disclosed in an article entitled "Nonlinear Amplifying Loop Mirror" by M E Fermann, F H Haberl, M Hofer and H Hochreiter, Optics Letters vol 15 no 13, Jul. 1, 1990. The position of the amplifier provides that the counterpropagating portions of an input signal have different intensities for a large proportion of their transit around the loop. If the amplified portions are of sufficient intensity to activate the non-linear regime of the optical fibre there will be an intensity dependent relative phase shift between the counterpropagating portions resulting in the required intensity dependent switching.

In the prior art embodiment just described the fibre loop was 306 m in order to achieve a sufficiently large intensity-loop length product.

BRIEF DESCRIPTION OF THE INVENTION

According to the present invention a Sagnac interferometer of the kind according to the preamble of claim 1 is characterised in that the coupling means includes an non-linear optical amplifier and that there are optical attenuation means for providing that the counterpropagating portions have different intensities on reaching the amplifier.

The inclusion of the asymmetric optical attenuation means results in one counterpropagating portion being attenuated more than the other prior to amplification by the non-linear amplifier. If the two components pass through the amplifier at different times, they will generate different average internal intensities and therefore different refractive indices. This causes the gain and phase-change experienced by the two components within the gain medium to be different. A phase difference alters the interference at the optical coupling means to provide the required switching without recourse to large lengths of optical fibre.

The loop length of the Sagnac loop interferometer and the position of the non-linear amplifier within the loop are now limited only by the need to temporarily separate the pulses through the amplifier.

In a preferred embodiment said means comprises sources of optical attenuation providing different amounts of optical attenuation between the first output port and the optical amplifier and the second output port and the optical amplifier. This provides a simple, rugged interferometer which uses well-established packaging technologies.

The non-linear amplifier is, conveniently, a semiconductor laser amplifier. The optical coupler may, in this embodiment, be an optical fibre coupler formed from the optical fibres coupled to the optical amplifier which obviates the need for splices to join to optical fibres to the output ports of the coupler.

The optical amplifier can be tuned to ensure that the portions have the same intensity on reaching the optical coupler for recombining to provide substantially complete switching between input ports. A further way to provide the intensity asymmetry at the optical amplifier is to include a further optical amplifier. In this case the two amplifiers may conveniently be part of the same twin stripe amplifier-coupler.

Other means may be devised to obtain the intensity asymmetry at the optical amplifier within the scope of the present invention as the invention does not rely in its broadest aspects on the particular manner in which this asymmetry is obtained.

The principle of operation and exemplary embodiments of the present invention will now be described with reference to the accompanying drawings in which

DESCRIPTION OF EXEMPLARY EMBODIMENTS

Figure 1:
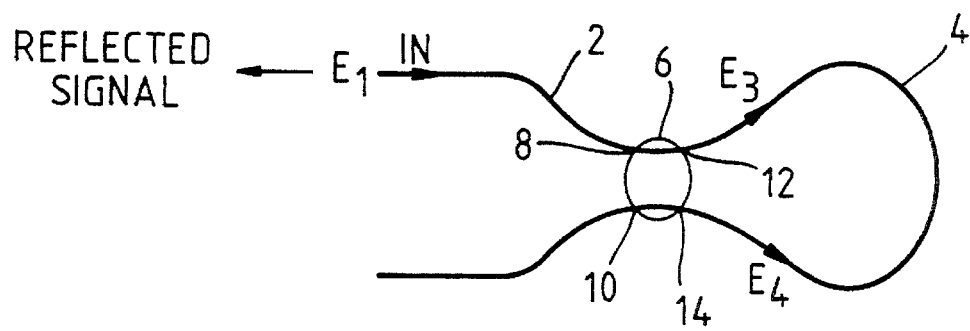
FIG. 1 is a schematic diagram of a prior art, symmetrical Sagnac interferometer loop mirror.

The Sagnac interferometer shown in FIG. 1 is defined by a single silica optical fibre 2 formed into a loop 4. Portions of the optical fibre form a coupler 6 having a first and a second input ports 8, 10 and a first and a second output port 12, 14. The coupler 6 is configured to couple equal portions of an optical signal at a working wavelength received at either of the ports 8 or 10 into each of the output ports 12, 14. Similarly, optical signals arriving at the coupler received by either of the port 12 or port 14 will be coupled equally into the ports 8 and 10.

The device shown in FIG. 1 acts as a mirror. That is, when an optical input $E_1$ is coupled to the input port 8, all the signal returns back to the port 8 in well known fashion. This is because coupler 6 causes the input to be split into two counter propagating fields which return in coincidence to combine back at the coupler 6. The optical path length is precisely the same for both propagating fields when the loop is stationary because they follow the same path but in opposite directions.

Figure 2:
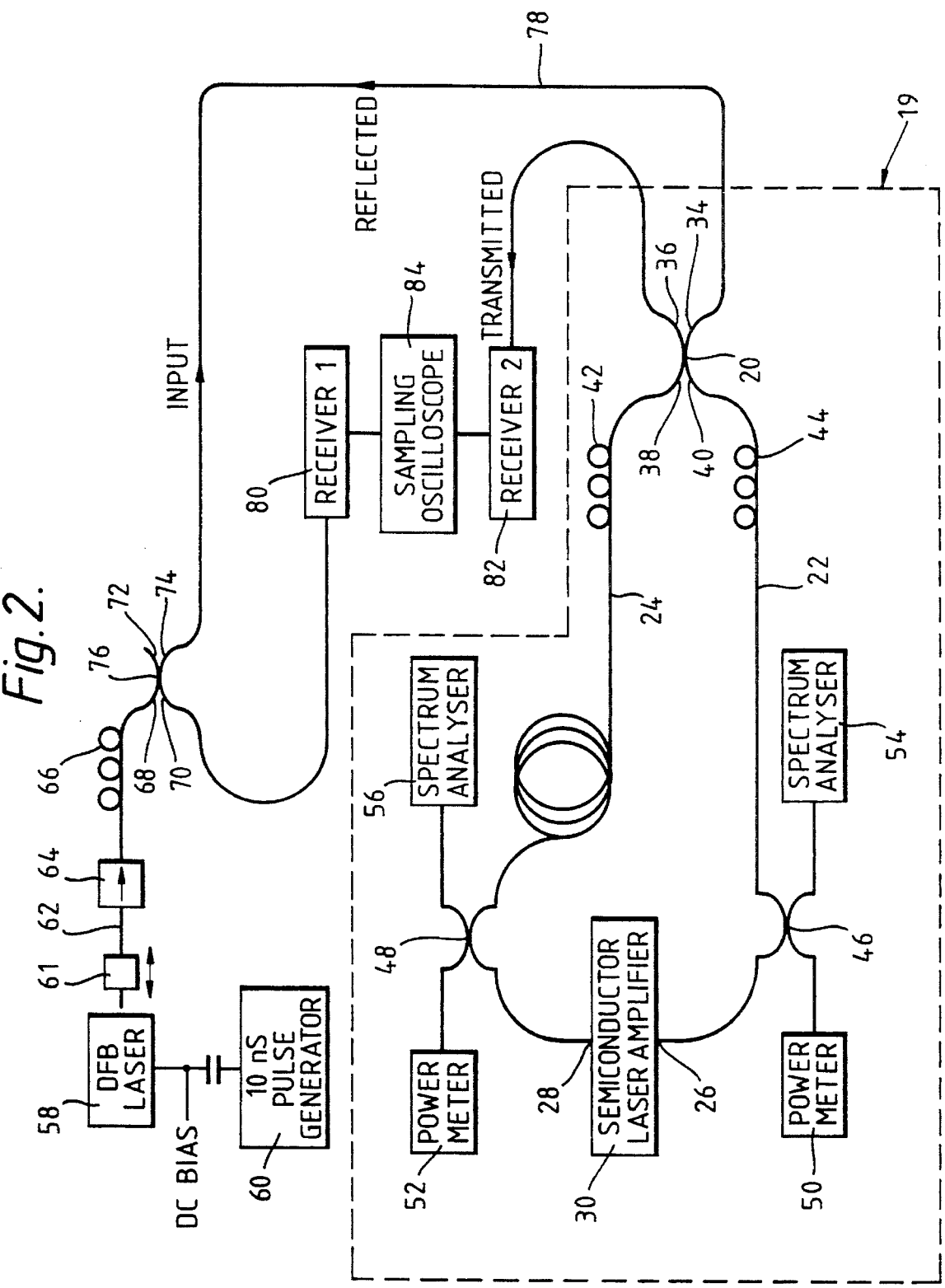
FIG. 2 is a schematic diagram of a Sagnac interferometer according to the present invention incorporated in an experimental arrangement to determine its operational characteristics.

Referring now to FIG. 2, a Sagnac interferometer 19 according to the present invention comprises a 50:50 optical fibre coupler 20 formed from standard single mode communications silica optical fibres 22 and 24 whose respective ends 26 and 28 are optically coupled to a semiconductor laser amplifier 30. The coupler has a first and a second input port 34,36 and a first and a second output port 38,40. The fibres 22 and 24 together with the amplifier 30 constitute the coupling means of the interferometer optically coupling the first and second output ports 38 and 40 of the coupler 20.

Polarization controllers 42 and 44, one each side of the amplifier 30, align the polarization of any counterpropagating portions of a signal introduced at one of the input ports 34, 36 of the coupler 20 to maximise amplifier gain and interference to obtain full switching.

In order to obtain different optical path lengths for the counterpropagating portions of an optical input signal, the portions must pass through the amplifier 30 at different times as well as being of different intensities. The former is achieved in this embodiment by forming the coupling means in which the fibre 24 is longer than the fibre 22, in this case 17 m and 10 m, respectively. The difference in fibre length required to prevent pulses arriving coincidentally in the amplifier 30 can be determined straightforwardly from a knowledge of the particular pulse train to be switched by the interferometer. The latter is achieved by asymmetry in optical attenuation of the counterpropagating signals as they propagate from the coupler 20 to the amplifier 30. The amplifier is tuned to obtain the same portions of equal intensity when they recombine at the optical coupler.

A pair of 95:5 optical fibre couplers 46 and 48, one spliced into each of the fibres 22 and 24 respectively, provide monitoring taps by which optical power meters 50 and 52 and spectrum analyzers 54 and 56, coupled to the couplers 46 and 48 can sample the counterpropagating portions of an input signal.

In this experimental arrangement of FIG. 2, a test input signal is obtained from a current modulated DFB laser 58 driven by a 10 ns pulse generator 60 to provide 10 ns pulses at 1.52 μm with a repetition rate of 10 μs. The output of the laser 58 is coupled via a lensed optical fibre 62 to an optical isolator 64 and then via a polarization controller 66 to port 68 of a four port coupler 76 with ports 68, 70, 72 and 74.

The wavelength of the laser 58 was temperature tuned to lie between two resonances of the gain spectrum of the amplifier 30. The pulse power adjusted using a piezo-electric translation stage 61 arranged to translate the fibre towards and away from the laser 58.

The port 74 of the coupler 76 is coupled to the port 34 of the coupler 20 by optical fibre 78 which couples the input pulses to the Sagnac interferometer 19.

Optical signals reflected by the Sagnac interferometer 19 exit port 34 of the coupler 20 and return via the optical fibre 78 to the coupler 76, a portion of which reflected signal is coupled to a first PINFET receiver 80 coupled to the output port 70 of the coupler 76.

Optical signals which are transmitted by the Sagnac interferometer 19, that is exit from the port 36, are coupled to a second PINFET receiver 82.

The electrical outputs from receivers 80 and 82 are connected to two inputs of a sampling oscilloscope 84 to measure the levels of the reflected and transmitted Sagnac interferometer signals.

The backward wave signal reflected from a facet of the amplifier 30 after propagating through the amplifier 30 was also measured by receivers 80 and 82. These signals are offset, temporally, one each side of the switched pulses. They produce equal components at the interferometer output ports 34 and 36 and can therefore be used to determined the relative losses constitute the means for providing that the counterpropagating portions have different intensities on reaching the amplifier 30 to, and responses of, the two receivers 80 and 82. The input power was monitored by measuring the reflection from the unterminated port 72 of the coupler 76 by receiver 80. All pulses level measurements were made 2ns after the pulse start to avoid any errors due to transient carrier effects.

Inherent optical fibre and amplifier coupling losses gave a 3.6 dB difference in power of the two portions of an optical signal coupled, into respective ends of the optical amplifier 30. This difference was principally due to the difference in insertion loss at the coupling of the fibres ends 26 and 28 of fibres 22 and 24 to the amplifier 30. This obviated the need to include a discrete attenuator in series with the amplifier to one side of the amplifier 30.

Because of the asymmetry of the optical attenuation of the counterpropagating portions as they pass from the coupler 20 to the amplifier 30, and because the portions pass through the amplifier 20 at different times, they generate different average intensities internal to the amplifier 30 and therefore different carrier densities and refractive indices. See for example Mukai, T, Yamamoto, Y; Kimura, T "Optical Direct Amplification for Fiber Transmission": Rev. Elec. Commun. Lab., Vol. 31, No. 3, p. 340, 1983 and Adams, M. J. Westlake, H. J.; O'Mahony, M. J.; Denning, I. D. "Comparison of Active and Passive Bistability in Semiconductors", IEEE J. Quantum Electron., Vol. QE-21, No. 9, September 1985 for discussion of these effects. The phase difference between the portions due to the different optical path lengths alters the interference at the coupler 36 to effect intensity dependant switching of the interferometer between reflection and transmission modes.

The reflected signal from port 34, $E_r$, and transmitted signal from port 36, $E_t$, for an input signal $E_i$ is given by the following equations $$E_r = E_i A\beta(1-\beta)[G_H + G_L + 2\sqrt{G_H G_L} \cos(\phi_H - \phi_L)] \quad (1)$$

$$E_t = E_i[\beta^2 G_H + (1-\beta)^2 G_L - 2\beta(1-\beta)\sqrt{G_H G_L} \cos(\phi_H - \phi_L)] \quad (2)$$

where A is the attenuation, $\beta$ is the power coupling factor of the coupler $G_H$ and $G_L$ are the amplifier power gains in the two directions, and $\phi_H$ and $\phi_L$ are the phase changes experienced by the input signals on passing through the amplifier.

If an ideal travelling wave amplifier were used the single-pass gain and phase-change for each pulse would be substituted into equations 1 and 2. For a near travelling wave (NTW) amplifier, the resonant cavity formed by the non-zero facet reflectivities must be taken into account. The gain and phase characteristics of NTW amplifiers are well known. See for example Adams, M. J. "Time dependent analysis of active and passive optical bistability in semiconductors" IEE PROCEEDINGS, Vol. 132, Pt. J, No. 6 December 1985, and Goldstein, J. A.; Garmire, E. M. "On the dynamic response of nonlinear Fabry-Perot interferometers", ibid., QE-17, pp. 366–374, 1981.

Figure 3:
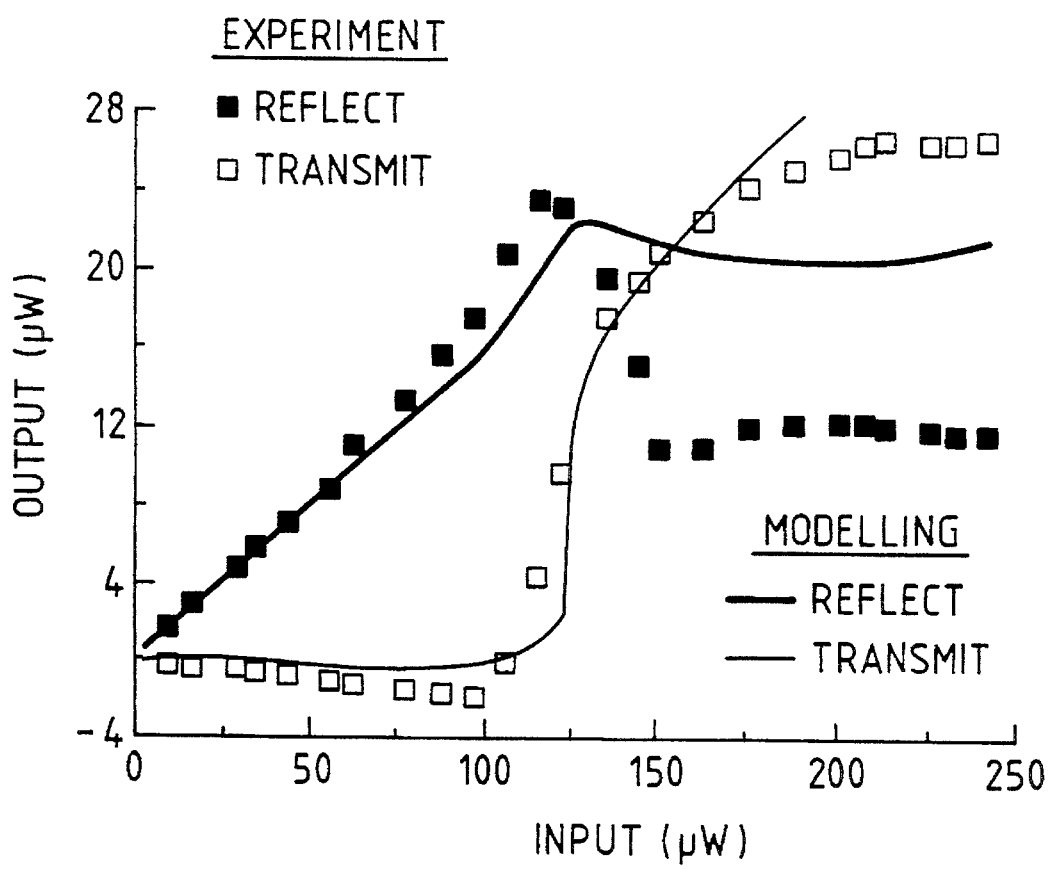
FIG. 3 is a graph of the theoretical and experimental results of the determination of the characteristics of the FIG. 2 embodiment.

FIG. 3 shows experimental results for the transmitted and reflected signals against the input power to the interferometer 19. The sharp transition of the transmitted signal at a deterministic pulse power is ideal for switching applications because a small change at the input produces a large change in the output signal. FIG. 3 also shows theoretical predictions based on estimations of the NTW amplifier parameters (saturation power=1.5 mW, unsaturated gain=25.6 dB, facet reflectivities=0.02, facet coupling losses=5 dB). The measured switching contrast is seen to be even greater than that predicted. The model indicates that the switching characteristic may be manipulated by adjusting the amplifier bias and the attenuator/coupler combination used.

The main applications for the device are for low power, all optical switching. The sharp switching transition obtained makes the device suitable for use in processing applications such as level-detection, pulse regeneration and optical logic devices. The non-reciprocal loop mirror may be implemented using faster nonlinear materials if required.

Alternatively, the present invention may utilize a further optical amplifier to provide the asymmetry in optical path length to the counterpropagating portions. The amplifier could be, for example, an erbium doped fibre amplifier.

Figure 4:
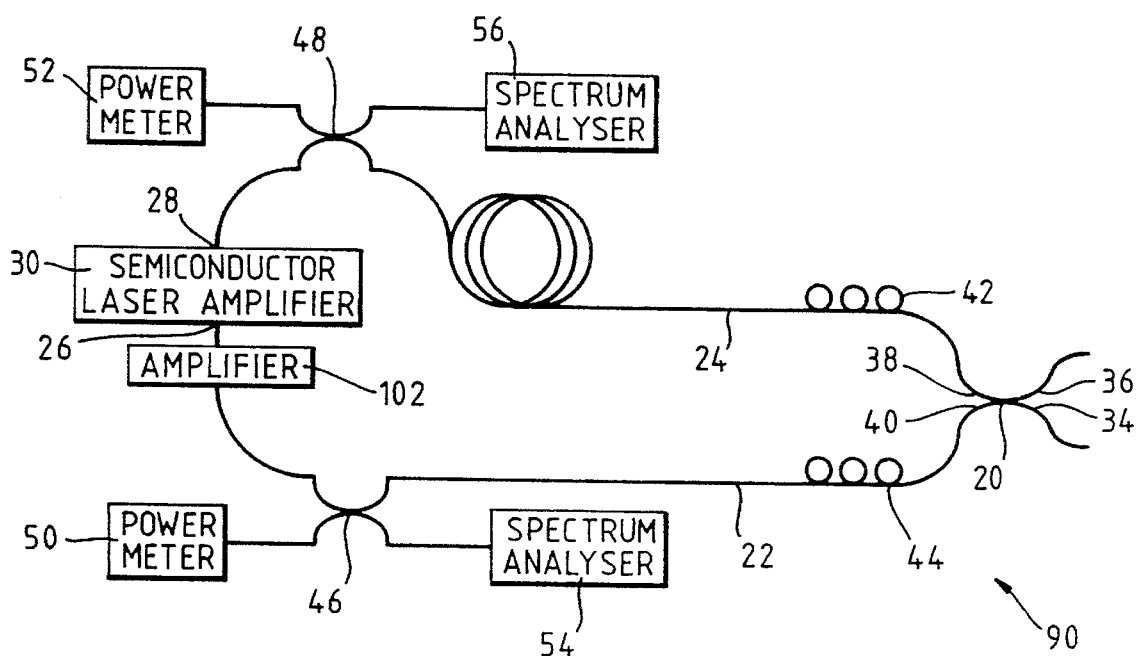
FIG. 4 is a schematic diagram of a further embodiment of a Sagnac interferometer according to the present invention.

Such an interferometer, 90, is shown in FIG. 4. It is the same as the embodiment 19 shown in FIG. 2, and the same reference numerals are used for the same elements, except for the addition of an amplifier 102 in series with the semiconductor laser amplifier 30.

Figure 5:
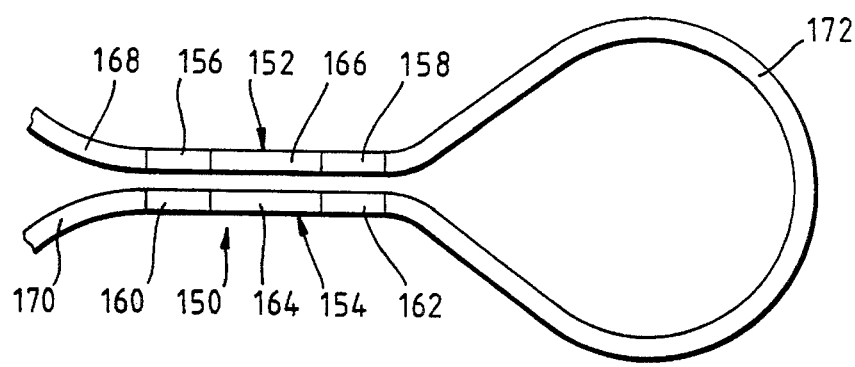
FIG. 5 is a schematic diagram of a yet further embodiment of the present invention.

Referring now to FIG. 5, an interferometer comprises a twin-strip laser amplifier/coupler 150 comprising strips 152 and 154. The strips have functionally distinct amplifying portions 156, 158, 160 and 162 and interactive cross-coupling regions 164 and 166. Each is separately controllable to provide desired gain and cross-coupling. The gain regions 156 and 160 provide input ports and are coupled to optical fibres 168 and 170, respectively. Gain providing regions 158 and 162 are optically coupled by an optical fibre loop 172 constituting the coupling means.

The gain regions are non-linear. Gain regions 158 and 162 can be tuned such that one provides less gain than the other and that signal portions at an input which is split by the coupling regions 152 and 150 to provide two counterpropagating signals in the loop 172 return to the coupling regions 150 and 152 with equal intensity. Because the gain regions are non-linear the counterpropagating portions will experience a differential phase shift in the non-linear amplifiers which is a function of the intensity of the input pulse and so provide intensity dependent switching of an input pulse at fibre 168 to fibres 168 and 170.

In each of the above described embodiments, a non-50:50 optical coupler may be employed as long as the devices in the coupling means, i.e. the Sagnac loop, provide equal intensity counterpropagating portions at their return to the optical coupler after propagating round the coupling means.

We claim:

1. A Sagnac loop interferometer comprising a four port optical coupler having a first and a second input port and a first and a second output port and an optical coupling means coupling the first and second output ports, characterised in that said optical coupling means includes a non-linear semiconductor laser optical amplifier and means for providing that counterpropagating portions of an optical signal introduced into said optical coupler have different intensities upon reaching said optical amplifier.

2. An interferometer as claimed in claim 1 in which said optical coupling means comprises sources of optical attenuation providing different amounts of optical attenuation between the first output port and the optical amplifier and the second output port and the optical amplifier.

3. An interferometer as claimed in claim 2 in which at least one of said sources of attenuation is non-linear.

4. An interferometer as claimed in claim 2 in which said optical coupling means comprises said optical amplifier coupled in series between a pair of optical fibres, a difference in optical attenuation in the coupling means being provided by different coupling losses between each of said optical fibres and said optical amplifier.

5. An interferometer as claimed in claim 4 in which said optical coupler is an optical fibre coupler formed from the optical fibres coupled to said optical amplifier.

6. An interferometer as claimed in claim 4 in which there is a first and a second polarization controller, one each side of the optical amplifier to control polarization of optical signals propagating around said optical fibres.

7. An interferometer as claimed in claim 1 in which said optical coupler is a 50:50 optical coupler.

8. A Sagnac loop interferometer comprising a four port optical coupler having a first and a second input port and a first and a second output port and an optical coupling means coupling the first and second output ports, characterized in that said optical coupling means includes a non-linear optical amplifier, an additional optical amplifier, and means for providing that counterpropagating portions of an optical signal introduced into said optical coupling means have different intensities on reaching said non-linear amplifier.

9. An interferometer as claimed in claim 8 in which said optical coupler, said optical amplifier and said additional optical amplifier are part of a single, twin-strip laser amplifier-coupler.

10. A Sagnac loop interferometer comprising a four port optical coupler having first and second input ports, first and second output ports, and an optical coupling means coupling the first and second output ports, the interferometer being such that an optical signal coupled to one of the input ports is split into two portions by said optical coupler, said portions counterpropagating around the coupling means, characterised in that said coupling means includes a non-linear semiconductor laser amplifier and means for asymmetrically varying the optical intensity of the counterpropagating portions, said non-linear semiconductor laser amplifier providing a phase difference between the counterpropagating portions, and said asymmetric optical intensity varying means being such that the optical intensity of one counterpropagating portion is varied more than the other counterpropagating portion prior to amplification in said non-linear semiconductor laser amplifier, whereby said counterpropagating portions have different intensities on reaching said amplifier.

11. An interferometer as claimed in claim 10, in which said asymmetric optical intensity varying means comprises sources of optical attenuation providing different amounts of optical attenuation between a first output port and said non-linear semiconductor laser amplifier and a second output port and said non-linear semiconductor laser amplifier.

12. An interferometer as claimed in claim 11, in which said non-linear semiconductor laser amplifier is coupled in series between a pair of optical fibres, the different amounts of optical attenuation in the coupling means being provided by the different coupling losses between each of the optical fibres and the amplifier.

13. An interferometer as claimed in claim 12, in which said optical coupler is an optical fibre coupler formed from the optical fibres.

14. An interferometer as claimed in claim 12, further comprising first and second polarization controllers positioned one on each side of the non-linear semiconductor laser amplifier, to control the polarization of optical signals propagating around the optical fibres.

15. An interferometer as claimed in claim 10, in which said optical coupler is a 50:50 optical coupler.

16. An interferometer as claimed in claim 10, in which said asymmetric optical intensity varying means comprises an optical amplifier.

17. An interferometer as claimed in claim 16, in which said optical coupler, said non-linear semiconductor laser amplifier and said optical amplifier are part of a single, twin-strip laser amplifier-coupler.

18. A Sagnac loop interferometer comprising:
 a four port optical coupler having a first and a second input port and a first and a second output port; and
 an optical coupling means coupling the first and second output ports comprising;
 a non-linear optical amplifier coupled in series between a pair of optical fibers;
 sources of optical attenuation provided by different coupling losses between each optical fiber and said optical amplifier providing different amounts of optical attenuation between the first output port and the optical amplifier and the second output port and the optical amplifier;
 means for providing counterpropagating portions of an optical signal introduced into said optical coupler having different intensities on reaching said amplifier; and
 a first and a second polarization controller on each side of said optical amplifier to control the polarization of said optical signals propagating around the optical fiber.

19. An interferometer as claimed in claim 18, in which said optical coupler is an optical fiber coupler formed from the optical fibers coupled to said optical amplifier.

* * * * *